United States Patent
Hayashi

(10) Patent No.: US 7,213,832 B2
(45) Date of Patent: May 8, 2007

(54) AIRBAG MODULE AND MODULE COVER

(75) Inventor: Shinji Hayashi, Shiga (JP)

(73) Assignee: Takata Corporation, Tokyo (JP)

( * ) Notice: Subject to any disclaimer, the term of this patent is extended or adjusted under 35 U.S.C. 154(b) by 421 days.

(21) Appl. No.: 10/796,994

(22) Filed: Mar. 11, 2004

(65) Prior Publication Data

US 2004/0262891 A1 Dec. 30, 2004

(30) Foreign Application Priority Data

Jun. 30, 2003 (JP) .............................. 2003-187667

(51) Int. Cl.
*B60R 21/20* (2006.01)
(52) U.S. Cl. .................... 280/728.3; 280/732
(58) Field of Classification Search ............. 280/728.3, 280/728.1, 731, 732
See application file for complete search history.

(56) References Cited

U.S. PATENT DOCUMENTS

| | | | |
|---|---|---|---|
| 5,152,548 A | 10/1992 | Zushi | |
| 5,383,681 A | 1/1995 | Sato | |
| 5,478,105 A | 12/1995 | Yamakawa et al. | |
| 5,573,267 A | 11/1996 | Yamakawa et al. | |
| 6,467,801 B1 * | 10/2002 | Preisler et al. | ........... 280/728.3 |
| RE36,898 E * | 10/2003 | Sawada et al. | .......... 280/728.1 |
| 2003/0107203 A1 | 6/2003 | Bauer et al. | |
| 2004/0207181 A1* | 10/2004 | Hayashi et al. | .......... 280/728.3 |

FOREIGN PATENT DOCUMENTS

| | | |
|---|---|---|
| JP | 6-3223 U | 4/1994 |
| JP | 7-32964 A | 2/1995 |
| JP | 7-15993 A | 8/1995 |
| JP | 7-277127 A | 10/1995 |
| JP | 2001-80442 A | 3/2001 |
| JP | 2004-338452 | 12/2004 |

* cited by examiner

*Primary Examiner*—Eric Culbreth
(74) *Attorney, Agent, or Firm*—Foley & Lardner LLP

(57) ABSTRACT

An airbag cover is provided with a linear laser cut groove constructed of holes having a depth within the range of the depth of the airbag cover so as to extend discontinuously and a recess thinned in the direction of the thickness at the end area of the laser cut groove. A recess extends in the direction along an extension L of the laser cut groove from the end of the laser cut groove and is provided with a first recess which is reduced in depth in the direction of the thickness (depth of thinning) as it gets closer to an end.

23 Claims, 6 Drawing Sheets

AIRBAG MODULE AND MODULE COVER

BACKGROUND

The present invention relates to a technology for constructing an airbag cover for covering a vehicle's airbag.

An airbag cover for covering a vehicle's airbag is provided in an airbag apparatus to be mounted to a vehicle. As an airbag cover of this type, for example, the construction in which a linear groove, which is referred to as tear line, is formed on the inner wall surface of the airbag cover is publicly known. The airbag cover is adapted to be deployed by being torn along the tear line upon collision of the vehicle for allowing a vehicle's airbag to be inflated and deployed toward the outside of the airbag cover.

In the construction described above, further improvement of the technology effective for smooth deployment of the airbag cover along the tear line at the time of inflation and deployment of the vehicle's airbag is highly demanded.

SUMMARY OF THE INVENTION

It is one object of the present invention to provide a rational construction technology of the airbag cover for covering the vehicle's airbag and a technology relating thereto. The present invention may be applied to various vehicles such as a motor vehicle, a train, a motorcycle (saddle-type vehicle), an airplane, and a watercraft.

The invention generally relates to a construction of an airbag cover for covering the vehicle's airbag. The airbag cover of the invention is provided with a groove and a portion reduced in thickness.

The groove may be formed linearly on the airbag cover by forming holes having a thickness within the range of the thickness thereof so as to extend discontinuously. A linear groove formed on a molded article by laser cutting as after-processing (processing by laser-processing equipment) is a typical example of a groove of the present invention. The groove formed by laser cutting has such construction that dot shaped holes are discontinuously formed. The groove is a portion having reduced thickness relative to other portions of the airbag cover, and the airbag cover is torn along such groove when the vehicle's airbag is inflated and deployed, and hence the deployment door of the airbag cover is deployed. This groove is referred to as the tear line.

The portion reduced in thickness has such construction that the thickness of the airbag cover is reduced in the direction of the thickness thereof in the end area of the groove (the end and the area in the vicinity thereof). Therefore, when the airbag cover is torn along the groove (broken along the groove and deployed), a force exerted to the groove acts directly on the portion reduced in thickness which is connected to the groove. The portion reduced in thickness may be formed, for example, when molding the airbag cover.

Specifically, according to the present invention, an extended portion is provided at the portion reduced in thickness. The extended portion extends from the end area of the groove in the direction along the extension of the groove. The extended portion has a construction in which the depth of thinning in the direction of the thickness varies gradually. The term "gradually varies" in this specification is intended to widely include a state in which the depth of thinning in the direction of thickness decreases or increases gradually, and the extent of gradual variation is no object. Therefore, not only a state in which the depth of thinning varies continuously at a constant ratio, but also a state in which the ratio changes from point to point and a state in which the depth of thinning varies step-by-step are included in the scope of "gradual variations" in the present invention.

In such construction according to the present invention, when the groove which extends discontinuously is torn entirely till the end when the airbag cover is torn, a force generated when being torn tends to concentrate to the end area. In such a case, a tearing phenomenon referred to as so-called "tearover" may occur on the portion along the extension of the groove from the end area. Accordingly, in the present invention, the portion reduced in thickness having the extended portion is provided in addition to the groove. Accordingly, a force exerted to the end area of the groove may be gradually dispersed in the direction along the extension of the groove at the extended portion of the portion reduced in thickness, and thus a force generated when being torn may be prevented as much as possible from concentrating to the end area of the groove.

Therefore, in accordance with the principles of the present invention, the rational construction technology of the airbag cover which can preferably control the cleaving action of the airbag cover at the time of inflation and deployment of the vehicle's airbag may be provided.

Preferably, the depth of thinning of the extended portion may be reduced gradually as the extended portion gets away from the end of the groove. This construction is rational because a force to tear the groove from the end along the extension reduces gradually as the extension gets away from the end of the groove.

More particularly, the portion reduced in thickness may further include a second extended portion. The second extended portion has a construction in which the extended portion is extended in the direction intersecting with the direction along the extension of the groove, and the depth of thinning in the direction of the thickness varies gradually along the direction of extension. The term "intersecting" referred here widely includes a state in which the extension of the groove and the second extended portion can cross with each other as well as a state of intersecting orthogonally, and the angle of intersection is no object.

According to this embodiment of the present invention, a force exerted on the end area of the groove when the airbag cover is torn is dispersed gradually in the direction along the extension of the groove at the extended portion, and in addition, the force is further dispersed in the directions different from that of the extension of the groove by the second extended portion, and thus the effect of dispersion of the force generated when being torn is assured.

In one embodiment, the width of the portion reduced in thickness in plan view reduces as the portion gets closer to the second extended portion from the extended portion in addition to the construction discussed above. In this construction, the force exerted to the end area of the groove when the airbag cover is torn is dispersed not only in the direction of the width of the portion reduced in thickness, but also in the direction of thickness thereof, and thus the effect of dispersion of the force generated when being torn is assured.

Preferably, the depth of thinning of the second extended portion reduces gradually as the second extended portion gets away from the extended portion. This construction is rational because the force dispersed from the extended portion to the second extended portion reduces as the second extended portion gets away from the extended portion.

More particularly, a thickened portion is provided on the extension of the extended portion or the second extended portion. The thickened portion has a construction in which the thickness of the airbag cover is expanded. The thickened portion may be formed, for example, when molding the airbag cover. In this construction, the force dispersed by the extended portion or the second extended portion may be received by the thickened portion, whereby a tear can be prevented from being formed on the side of the thickened portion opposite from the extended portion or the second extended portion.

In one embodiment, the extended portion or the second extended portion extends toward the hinged portion in addition to the construction previously discussed. The hinged portion has a construction to allow the deployment door to deploy in the case in which the airbag cover is torn along the groove when the vehicle's airbag is inflated and deployed. Such construction of the present invention is especially effective for improving the feasibility of deployment of the deployment door.

In another embodiment, the present invention relates to the construction of the airbag module. The airbag module includes a vehicle's airbag, a storage member for storing the vehicle's airbag, gas supplying means for supplying expansion gas to the vehicle's airbag, and an airbag cover as broadly described above, and the airbag module is mounted to the vehicle in whole. It is also possible to include a member in which the airbag cover is installed, that is, a panel referred to as so-called instrument panel in the airbag module of the present invention.

Therefore, the present invention provides a rational construction technology of the airbag module, in which the cleaving action of the airbag cover is preferably controlled when the vehicle's airbag is inflated and deployed.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Figure 1:
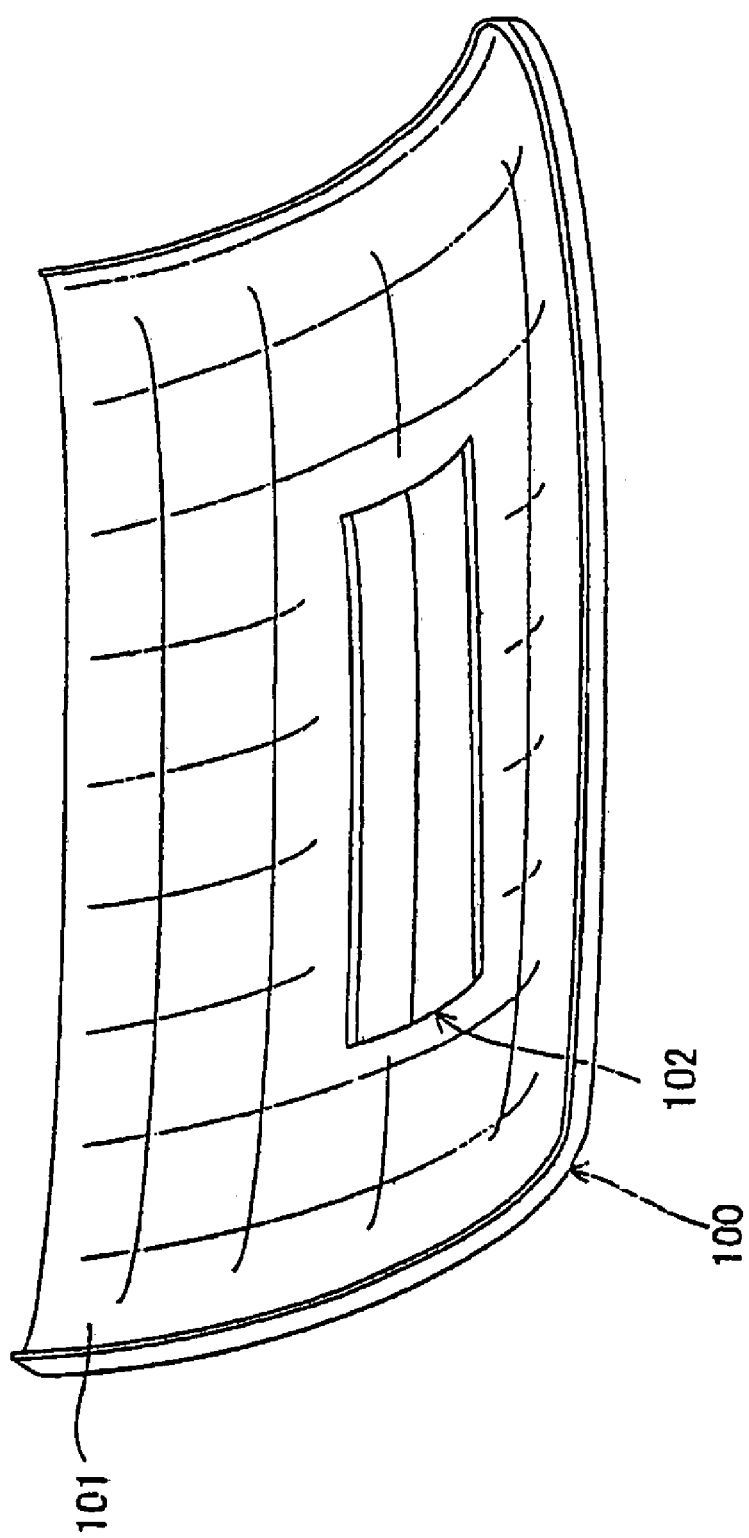
FIG. 1 is a perspective view of the airbag cover 100 according to the present embodiment when viewed from the back surface 101 thereof.
Figure 2:
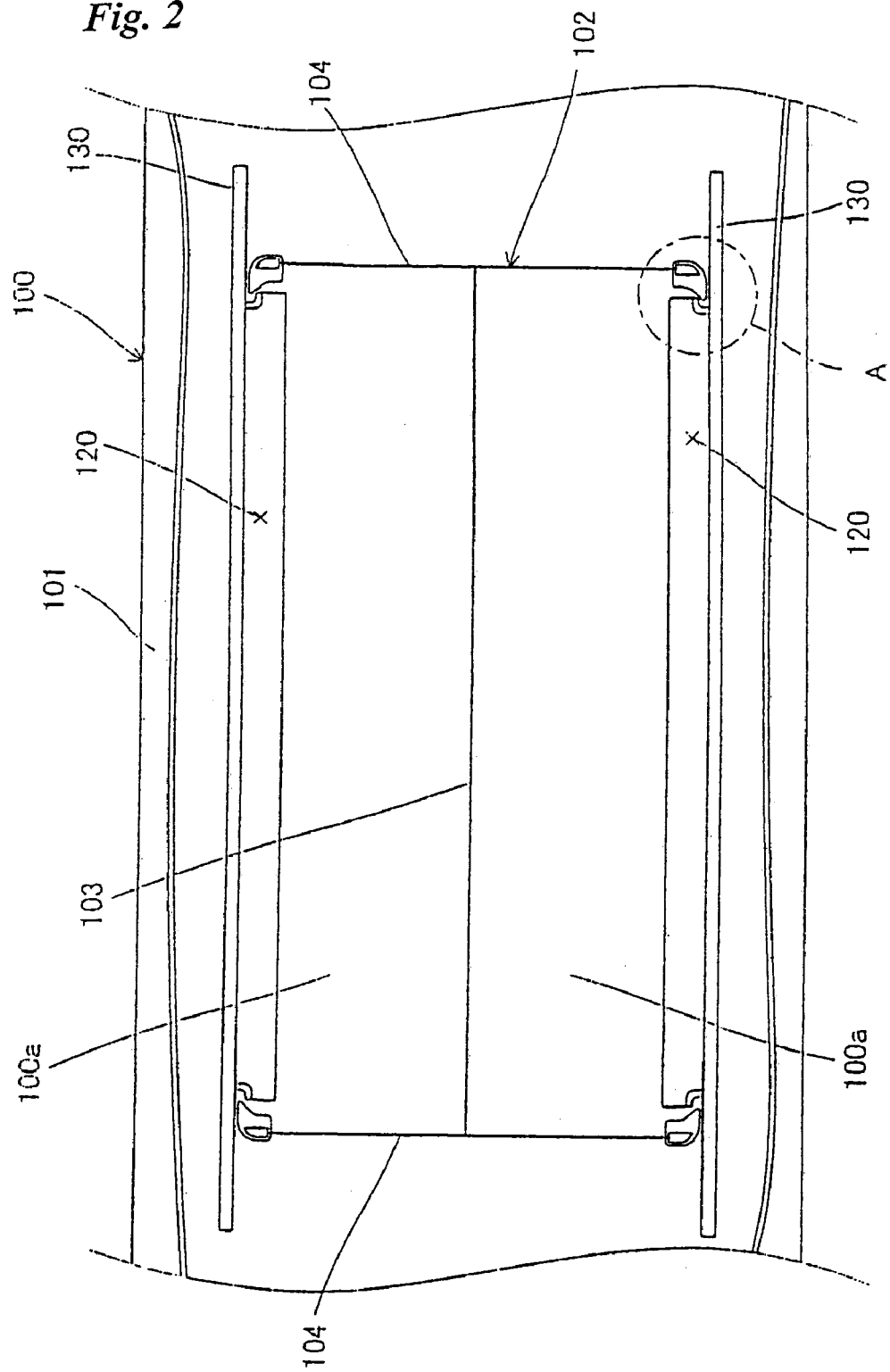
FIG. 2 is a plan view showing a portion in the vicinity of a tear line 102 in FIG. 1.
Figure 3:
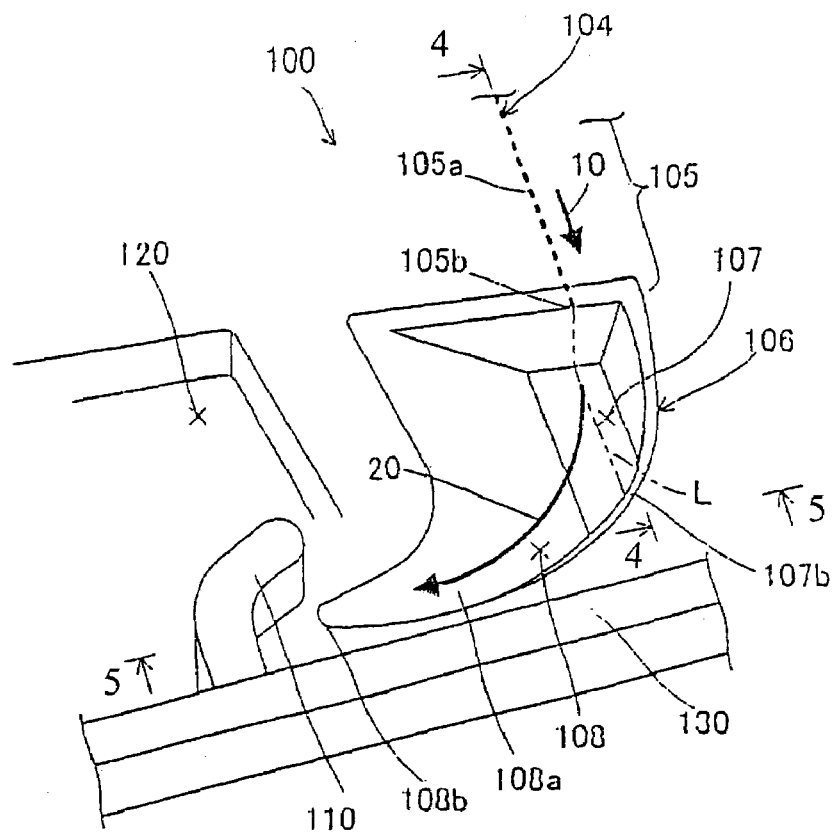
FIG. 3 is an enlarged view of a portion indicated by the letter A in FIG. 2.
Figure 4:
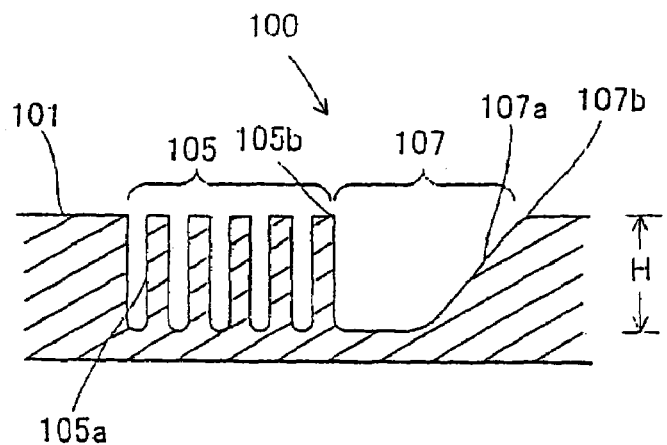
FIG. 4 is a drawing showing a cross sectional construction view taken along the line 4—4 in FIG. 3.
Figure 5:
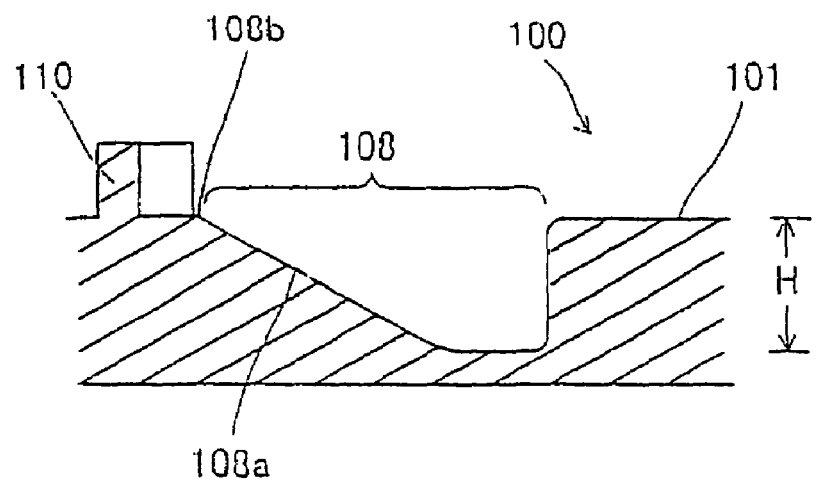
FIG. 5 is a drawing showing a cross sectional construction view taken along the line C—C in FIG. 3.

According to the present invention, a rational construction technology of the airbag cover for covering the vehicle's airbag, and a technology relating thereto is described herein. Referring now to the drawings, an embodiment of the present invention will be described. First, the construction of an airbag cover 100 according to the present embodiment will be described based on FIG. 1 to FIG. 5. FIG. 1 is a perspective view of the airbag cover 100 according to the present embodiment when viewed from the back surface 101 thereof. FIG. 2 is a plan view showing a portion in the vicinity of a tear line 102 in FIG. 1. FIG. 3 is an enlarged view of a portion indicated by the letter A in FIG. 2. FIG. 4 is a drawing showing a cross sectional construction view taken along the line 4—4 in FIG. 3. FIG. 5 is a drawing showing a cross sectional construction view taken along the line 5—5 in FIG. 3.

As shown in FIG. 1, according to an embodiment of the present invention, the tear line 102 is formed on the back surface 101 of the airbag cover 100 for covering a vehicle's airbag. The airbag cover 100 has a plate shape formed three-dimensionally (solid state) of resin material for example but not limited to PP (polypropylene) or TPO (Thermoplastic Elastomer Polyolefin). The back surface 101 of the airbag cover 100 is defined to be a surface on the back side when the surface facing an occupant in the state in which the airbag cover 100 is installed is assumed to be a front surface.

The tear line 102 is a portion reduced in thickness provided for allowing the deployment of the airbag cover 100 when the vehicle's airbag is inflated. In one embodiment, it is constructed of a linear groove formed on the back surface 101 of the airbag cover 100. The tear line 102 is defined as a substantially linear thinned portion which has a relatively smaller thickness with respect to the thickness of other portions of the airbag cover 100. The tear line 102 corresponds to a "groove" in the present invention.

In this embodiment, the airbag cover 100 is torn along the tear line 102 when the vehicle's airbag is inflated and deployed, and a pair of deployment doors 100a is adapted to be deployed like double doors (like casement doors) toward the front side of the cover, that is, broken along the tear line 102 and deployed.

As shown in FIG. 2, the tear line 102 is constructed of a combination of a single first linear groove 103 and two second linear grooves 104, and is formed substantially into an H-shape as a whole in plan view. The first linear groove 103 extends linearly in the lateral direction in FIG. 2, and the second linear grooves 104 extend linearly in the vertical direction (in the directions orthogonal to the first linear groove 103) in FIG. 2 at both ends of the first linear groove 103.

At the positions where the two second linear grooves 104 oppose, hinged portions 120 extending in parallel to the first linear groove 103 are provided on both sides of the first linear groove 103. The hinged portions 120 are thinned portions (portion to which mass-removal is done) which are relatively thinner than other portions of the airbag cover 100, and are recessed from the back surface 101 of the cover toward the front side. The hinged portions 120 are adapted to serve as hinge mechanism when the airbag cover 100 is torn along the tear line 102 and deployed. The hinged portions 120 correspond to "hinged portions" in the present invention.

On the outsides of the hinged portions 120, there are provided joint ribs 130 along the direction in which the hinged portions 120 are extended. The joint ribs 130 are used as joined portions when a storage member for storing the vehicle's airbag is joined to the back surface 101 of the cover by welding, though it is not shown.

Referring now to FIG. 3 to FIG. 5, the detailed construction of the portion A in FIG. 2 of the airbag cover 100 will be described. The portion A is formed at both end areas of the second linear grooves 104, that is, four locations (four corners) on an tear line 102.

As shown in FIG. 3, laser cut groove 105 is formed at the end area of the second linear groove 104. The laser cut groove 105 is constructed of dot shaped holes 105a (depth of the hole H) formed by laser cut so as to extend discontinuously. In other words, recesses and projections defined by the holes 105a are alternately repeated in the direction in which the laser cut groove 105 extends. The holes 105a correspond to "holes having a depth within the range of thickness of the airbag cover".

As shown in FIG. 3, in the area of the end 105b of the laser cut groove 105 (end area of the second linear groove 104), a recess 106 is formed on the extension of the laser cut groove 105. In other words, the area of the end 105b of the laser cut groove 105 is provided with a construction combining the laser cut groove 105 and the recess 106 (hybrid construction). The recess 106 includes a first recess 107 and a second recess 108. The area of the end 105b of the laser cut groove 105 (the end area of the second linear groove 104) corresponds to an end area.

The first recess 107 extends from the area of the end 105b of the laser cut groove 105 in the direction along an extension L of the laser cut groove 105 (the direction indicated by an arrow 10 in FIG. 3). The first recess 107 corresponds to an extended portion and an extension L corresponds to an extension.

The second recess 108 is extended in the direction intersecting with the direction along the extension L of the laser cut groove 105 (the direction toward a stopper rib 110 and the hinged portion 120). The second recess 108 corresponds to a second extended portion.

As shown in FIG. 4, the first recess 107 has a depth H which is equivalent with the depth H of the hole 105a of the laser cut groove 105, and includes a bevel 107a on the side of the end 107b thereof. In one embodiment, the depth of the recess in the direction of the thickness of the bevel 107a (depth of thinning) reduces gradually at a constant ratio from the side of the laser cut groove 105 as it get closer to the end 107b (as it gets away from the end 105b of the laser cut groove 105). The first recess 107 corresponds to an extended portion.

On the other hand, as shown in FIG. 5, the second recess 108 has a depth H which is equivalent to the depth H of the hole 105a of the laser cut groove 105, and further has a bevel 108a. In one embodiment the depth of the bevel 108a in the direction of the thickness (depth of thinning) reduces gradually at a constant ratio from the first recess 107 as it gets closer to the end 108b (as it gets away from the bevel 107a). The second recess 108 corresponds to a second extended portion.

In one embodiment, the width of the groove of the second recess 108 in plan view reduces gradually as it gets closer to the end 108b. This state corresponds to a state in which the width of the portion reduced in thickness in plan view reduces as it gets closer to the second extended portion from the extended portion. The construction in which the width of the groove of the second recess 108 is reduced step by step as it gets closer to the end 108b may also be applicable.

In one embodiment, the stopper rib 110 is provided on the extension extending from the first recess 107 to the second recess 108. The stopper rib 110 is a rib formed by expanding the thickness of the airbag cover 100, and corresponds to a thickened portion. The stopper rib 110 is recessed on the side of the end 108b of the second recess 108 in plan view, and is constructed to surround the end 108b.

When manufacturing the airbag cover 100 in the construction described above, a molded article on which the tear line 102 is not formed, for example, a plate-shaped molded article formed three-dimensionally, is manufactured first. When molding such molded article, the above-described recess 106, the stopper rib 110, the hinged portion 120, and the joint rib 130 are preferably molded together. Subsequently, the molded body is formed with the tear line 102 by after-processing (in one embodiment, laser cut using a laser cut machining equipment). By providing the tear line 102 using laser cutting as the after-processing, the problem of so-called molding sink is minimized and thus the appearance is improved.

Figure 6:
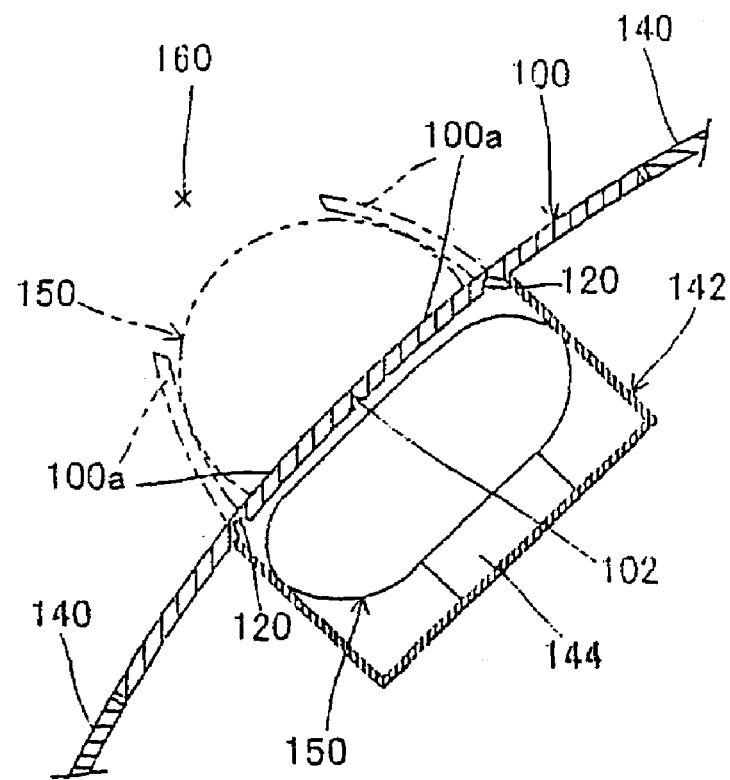
FIG. 6 is a cross sectional view showing the construction of the airbag module in a state in which the airbag cover 100 is torn.

Subsequently, referring to FIG. 3 and FIG. 6, the operation of the airbag cover 100 constructed as described above will be described. FIG. 6 is a cross sectional view showing the construction of the airbag module in a state in which the airbag cover 100 is torn.

As shown in FIG. 6, the airbag module is constructed mainly of the airbag cover 100 constructed as described above, the vehicle's airbag 150, the storage member (retainer) 142 in which the vehicle's airbag 150 is stored in the folded state, and gas supplying means (inflator) 144 built in the storage member 142 for supplying expansion gas to the vehicle's airbag 150. The cover 100 may be positioned in an instrument panel 140.

In case of the front collision of the vehicle, the gas supplying means 144 is activated and the vehicle's airbag 150 is deployed by the expansion gas supplied from the gas supplying means 144. The airbag cover 100 is torn along the substantially H-shaped tear line 102 upon inflation and deployment of the vehicle's airbag 150, and a pair of deployment doors 100a are brought into deployment like double doors (e.g., casement doors) away from the front surface of the cover.

At this time, the second linear groove 104 is torn along the laser cut groove 105 in the direction indicated by the arrow 10 in the drawing as shown in FIG. 3. Here, since the laser cut groove 105 is formed of holes 105a extending discontinuously and thus recesses and projections defined by the holes 105a are alternately repeated, when the laser cut groove 105 is torn entirely to the end 105b, a force that attempts to tear linearly along the extension L tends to be concentrated to the portion on the extension in the area around the end 105b. In such a case, a tearing phenomenon referred to as so-called "tearover" may occur along the extension L on the portion including the extension L at the end 105b of the laser cut groove 105.

Therefore, in the present embodiment, the recess 106 is provided on the extension of the laser cut groove 105 in addition to the laser cut groove 105, as shown in FIG. 3. The recess 106 is effective for gradually dispersing the force that attempts to generate tearover along the extension L of the laser cut groove 105 and preventing the force generated when being torn from concentrating to the area around the end 105b of the laser cut groove 105. In other words, the force exerted to the area of the end 105b of the laser cut groove 105 when the airbag cover 100 is torn is dispersed (absorbed) gradually at the bevel 107a of the first recess 107, and is attenuated as it gets closer to the end 107*b*. Accordingly, the tearing operation of the airbag cover 100 can be preferably controlled.

In addition, according to the present embodiment, the second recess 108 extending from the first recess 107 to the stopper rib 110 is provided on the recess 106. Therefore, the force that attempts to tear linearly the portion along the extension L of the laser cut groove 105 may be dispersed by the first recess 107, and then the force may further be dispersed in the directions different from the direction of the extension L of the laser cut groove 105 by the second recess 108 (the direction indicated by an arrow 20 in FIG. 3). Specifically, according to the present embodiment, since the depth of the second recess 108 (depth of thinning) and the width of the groove in plan view are gradually reduced as the recess gets closer to the end 108*b*, the force exerted on the area of the end 105*b* of the laser cut groove 105 is dispersed not only in the direction of the depth, but also in the direction of width when the airbag cover 100 is deployed, and thus the effect of dispersion of the force is assured. Therefore, tearover may be effectively prevented from occurring on the portion including the extension L of the laser cut groove 105 of the airbag cover 100.

In addition, according to the present embodiment, the stopper rib 110 may receive the force dispersed in the direction toward the stopper rib 110 by the second recess 108. Accordingly, even when a tear is formed from the first recess 107 to the second recess 108, a tear is prevented from being formed on the side of the stopper rib 110 opposite from the recess 106 by the stopper rib 110.

In this manner, the pair of deployment doors 100*a* of the airbag cover 100 becomes deployed toward the front surface of the cover. At this time, the tears on both sides of the respective deployment doors 100*a* (the end area of the second linear groove 104) extends from both sides of the deployment door 100*a* inwardly by the effect of the recess 106 constructed as described above. Such construction is especially effective to improve feasibility of deployment of the respective deployment doors 100*a*.

As shown in FIG. 6, the vehicle's airbag 150 is deployed toward the outside of the airbag cover 100 through the deployment doors 100*a* in the deployed state, and projects toward the occupant crash protection area 160 defined in front of the occupant into the inflated and deployed state.

As described above, in accordance with the principles of the present invention, the airbag cover that can preferably control the cleaving action of the airbag cover when the vehicle's airbag is inflated and deployed, and a rational construction technology of the airbag module is thus provided. In other words, when the airbag cover 100 is torn, the force generated when being torn may be prevented as much as possible from concentrating to the area at the end 105*b* of the laser cut groove 105 by the recess 106. Accordingly, occurrence of tearover along the extension of the laser cut groove 105 may be prevented.

Specifically, the force exerted to the end 105*b* of the laser cut groove 105 may be dispersed gradually in the direction along the extension of the laser cut groove 105 by the first recess 107, and then the force may further be dispersed in the directions different from the direction of the laser cut groove 105 by the second recess 108, thereby further ensuring prevention of tearover.

In addition, since the force dispersed by the second recess 108 may be received by the stopper rib 110. The rib 110 is effective to prevent the torn portion from being formed on the opposite side of stopper rib 110 from the second recess 108.

By forming the second recess 108 so as to extend in the direction toward the hinged portion 120, feasibility of deployment of the deployment door 100*a* when the airbag cover 100 is torn is effectively improved.

The present invention is not limited to the embodiment described above, and various applications or modifications may be considered. For example, the following embodiments in which the above-described invention is applied may be implemented.

Figure 7:
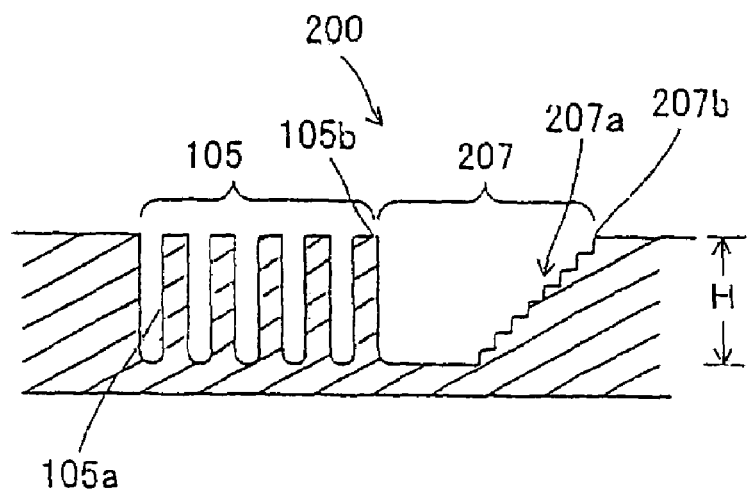
FIG. 7 is a cross sectional view showing the construction of an airbag cover 200 according to another embodiment at the same portion as FIG. 4.
Figure 8:
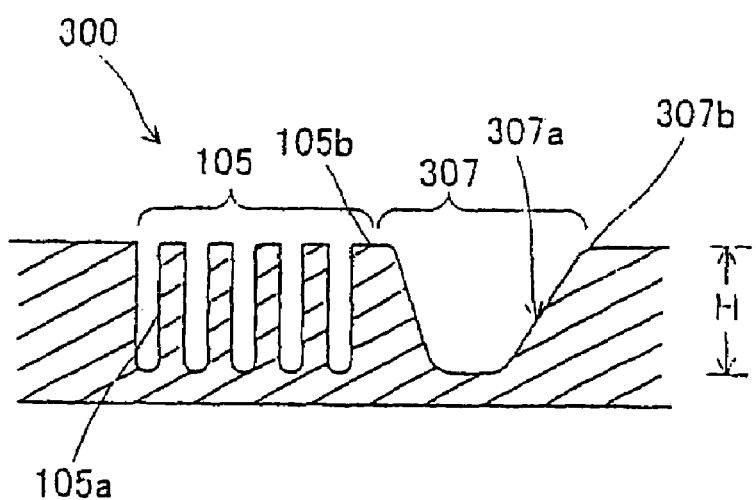
FIG. 8 is a cross sectional view showing the construction of an airbag cover 300 according to another embodiment at the same portion as FIG. 4.

Although the case in which the recess 106 is constructed in such a manner that the depth in the direction of thickness at the bevel 107*a* of the first recess 107 and the bevel 108*a* of the second recess 108 varies gradually at a constant ratio has been described in the embodiment described above, what is essential according to the present invention is that the depth in the direction of the thickness is varied gradually at the bevels 107*a* and 108*a*. Referring now to FIG. 7 and FIG. 8, the state of gradual variation other than that in the previously discussed embodiment will be described. The same parts in these drawings are represented by the same reference numerals as those in FIG. 4, and detailed description of the component will be omitted.

An airbag cover 200 shown in FIG. 7 is provided with a first recess 207 at the same position as the first recess 107. The depth of a bevel 207*a* in the first recess 207 in the direction of thickness (depth of thinning) reduces step by step, as the recess 207 gets closer to an end 207*b* from the side of the laser cut groove 105 (i.e., as the recess 207 gets away from the end 105*b* of the laser cut groove 105).

In the case of an airbag cover 300 shown in FIG. 8, a first recess 307 is provided at the same position as the first recess 107. The depth of a bevel 307*a* in the first recess 307 (depth in thinning) in the direction of thickness increases once gradually at a constant ratio as the recess 207 gets closer to the end 207*b* from the side of the laser cut groove 105 (i.e., as the recess 207 gets away from the end 105*b* of the laser cut groove 105), and then reduces gradually at a constant ratio.

Figure 9:
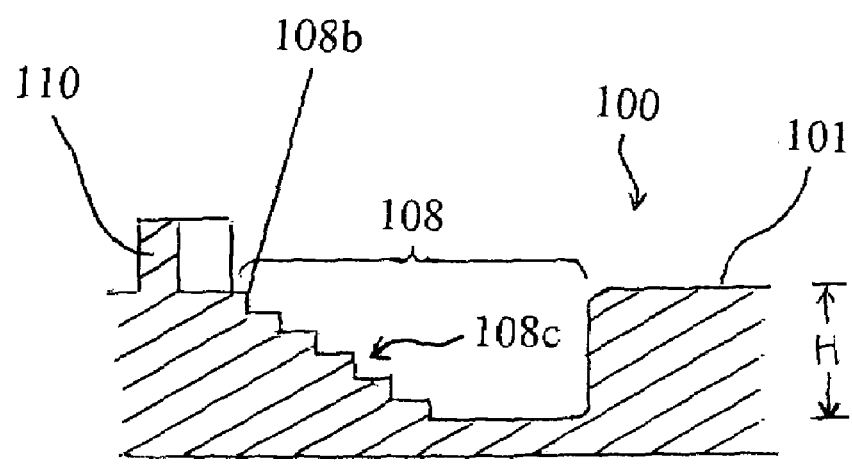
FIG. 9 is a schematic cross sectional view showing the construction of an airbag cover according to another embodiment.

FIG. 9 shows a further embodiment of an airbag cover 100 that is provided with a second recess 108. The depth of a bevel 108*c* in the second recess 108 in the direction of thickness (depth of thinning) increases step by step, as it gets closer to an end 108*b* of the first portion (as it extends away from the end 105*b* of the laser cut groove 105).

With the construction of the first recess 207 shown in FIG. 7, the first recess 307 shown in FIG. 8, the second recess 108 shown in FIG. 9, and as in the case of the first recess 107 in the present embodiment, such effect that the force exerted to the area of the end 105*b* of the laser cut groove 105 when the airbag cover 100 is torn can be dispersed (absorbed) gradually is achieved. Although the state of gradual variations at the bevel 107*a* of the first recess 107 has been described in conjunction with FIG. 7 and FIG. 8, the state of gradual variations may be applied to the construction of the bevel 108*a* of the second recess 108, as shown in the example of FIG. 9.

Although the construction in which the stopper rib 110 is provided on the extension of the recess 106 extending from the first recess 107 to the second recess 108 has been described in the embodiment described above, the stopper rib 110 maybe omitted depending on the extent of the force exerted to the second recess 108 when the airbag cover 100 is torn.

Although the construction in which the second recess 108 of the recess 106 is extended in the direction toward the hinged portion 120 has been described in the embodiment described above, the direction of extension of the second recess 108 is not limited to the direction toward the hinged portion 120, and may be modified in various ways as needed.

Although the construction in which the recess 106 is provided with the first recess 107 and the second recess 108 is described in the embodiment above, the construction in which the recess 106 is provided with at least the first recess 107 is sufficient in the present invention. In this case, it is preferable to provide the thickened portion as the stopper rib 110 on the extension of the first recess 107.

The priority application, Japan Patent Application 2003-187667, filed Jun. 30, 2003 including the specification, drawings, claims and abstract, is incorporated herein by reference in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the invention are to be included as further embodiments of the present invention. The scope of the present invention is to be defined as set forth in the following claims.

What is claimed is:

1. An airbag cover for covering a vehicle's airbag comprising:
   a groove comprising holes extending discontinuously within a range of a thickness of the airbag cover; and
   a portion reduced in thickness which is thinned in a direction of the thickness at an end area of the groove, and which extends from the end area of the groove in a direction along an extension of the groove, and is formed with an extended portion in which a depth of thinning in the direction of the thickness varies gradually;
   wherein the airbag cover is adapted to be torn along the groove when the vehicle's airbag is inflated and deployed;
   wherein the depth of thinning of the extended portion is reduced gradually as the extended portion extends away from the end of the groove along an extension of the groove.

2. The airbag cover of claim 1, wherein the extended portion comprises a bevel in the direction of thickness.

3. The airbag cover of claim 1, wherein the portion reduced in thickness comprises a second extended portion extended from the extended portion in the direction orthogonal to the direction along the extension of the groove, and the depth of thinning of the second extended portion in the direction of the thickness varies gradually along the direction of extension.

4. The airbag cover of claim 3, wherein a width of the portion reduced in thickness in plan view reduces as it gets closer to the second extended portion from the extended portion.

5. The airbag cover of claim 3, wherein the depth of thinning of the second extended portion reduces gradually as it gets away from the extended portion.

6. The airbag cover of claim 5, wherein the gradual reduction is stepwise.

7. The airbag cover of claim 3, further comprising a thickened portion, in which the thickness of the airbag cover is expanded, located adjacent an end of the extension of the extended portion or the second extended portion.

8. The airbag cover of claim 1, further comprising a hinged portion for allowing deployment action of the airbag cover when being torn along the groove.

9. The airbag cover of claim 8 further comprising joint ribs substantially parallel to the hinged portion.

10. An airbag cover comprising:
    a lateral groove comprising holes extending discontinuously;
    a first recess extending from an end of the lateral groove and a second recess extending from an end of the first recess in a direction substantially orthogonal to the first recess, wherein each recess includes first and second ends;
    wherein a depth of the first recess reduces gradually as the recess extends away from the lateral groove.

11. The airbag cover of claim 10, wherein the second portion extends from the end area of the first portion in the direction along an extension of the first recess.

12. The airbag cover of claim 10, wherein the second portion includes a beveled surface.

13. The airbag cover of claim 10, wherein the gradual reduction in depth of the first recess occurs in a stepwise manner.

14. The airbag cover of claim 10, wherein the depth of the second recess is gradually reduced in a direction away from the first recess.

15. The airbag cover of claim 10, further comprising a thickened portion located adjacent the end of the second recess.

16. The airbag cover of claim 10, further comprising a hinged portion for allowing deployment action of the airbag cover when being torn along the groove.

17. The airbag cover of claim 16, wherein the second recess extends in the direction of the hinged portion.

18. An airbag module for a vehicle comprising
    an airbag;
    an airbag cover;
    a gas generator;
    a groove formed linearly on the airbag cover by forming holes having a depth within the range of thickness thereof so as to extend discontinuously, and wherein the groove includes a portion that extends wherein the depth of the groove is gradually reduced as the groove extends towards the edge of the airbag.

19. The airbag cover of claim 18, further comprising a second groove extending generally orthogonal to the direction of the first groove, wherein the depth of the second groove gradually reduces as the second groove extends away from the first groove.

20. An airbag cover, comprising:
    a groove including holes that extend in a discontinuous manner, and
    a recess extending from an end of the groove, wherein the recess varies in depth along a direction of an extension of the groove,
    wherein the airbag cover is configured to be torn along the groove when an airbag for a vehicle is inflated and deployed.

21. The airbag cover of claim 20, wherein the depth of the recess gradually reduces along the direction extending in the direction of the groove.

22. The airbag cover of claim 20, further comprising a second recess that varies in depth along a direction that extends laterally to the groove.

23. The airbag cover of claim 22, wherein the depth of the second recess gradually reduces along the direction extending in the direction of the groove.

* * * * *